Dec. 27, 1927.  1,653,946
H. CLAUSEN
ELECTRIC STEP BY STEP MOTOR
Filed June 13, 1924  2 Sheets-Sheet 1
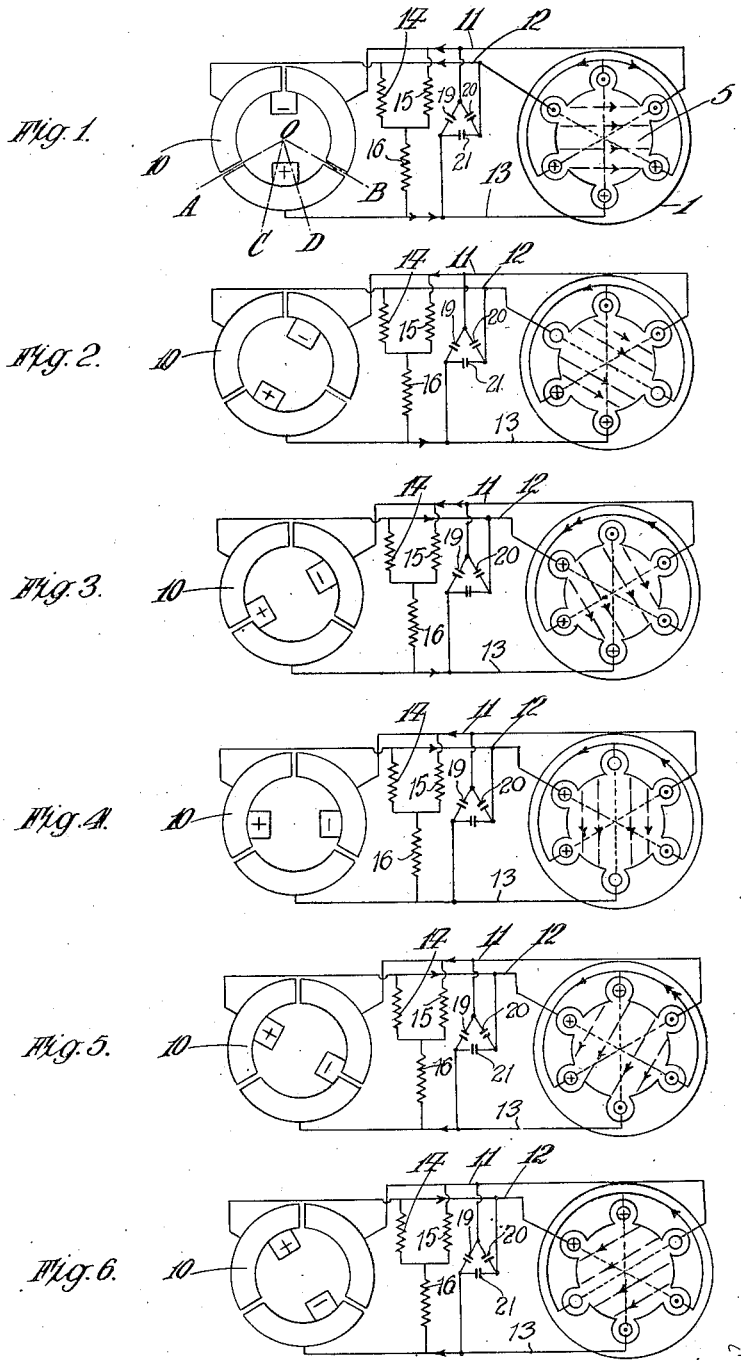

Dec. 27, 1927.  1,653,946
H. CLAUSEN
ELECTRIC STEP BY STEP MOTOR
Filed June 13, 1924  2 Sheets-Sheet 2
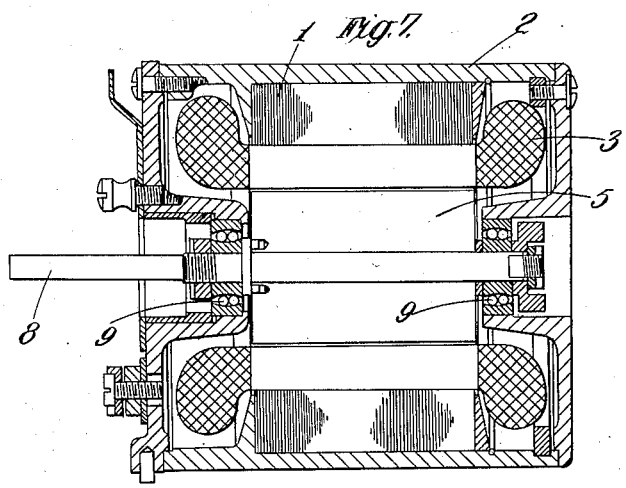
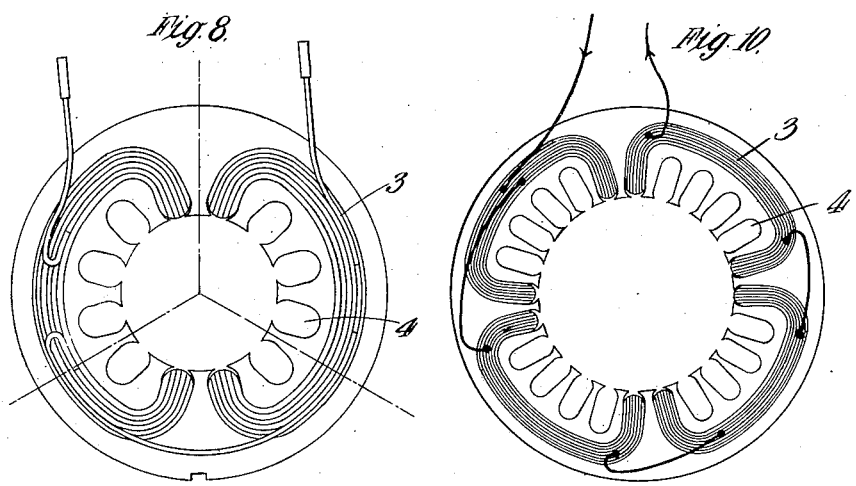
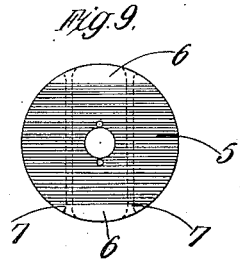
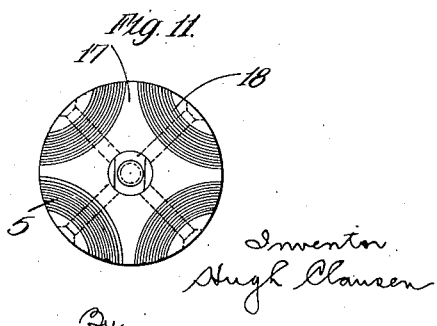
Inventor
Hugh Clausen
By Pennie, Davis, Marvin & Edmonds
Attorneys Patented Dec. 27, 1927.

1,653,946

UNITED STATES PATENT OFFICE.

HUGH CLAUSEN, OF CRICKLEWOOD, LONDON, ENGLAND, ASSIGNOR TO VICKERS LIMITED, OF WESTMINSTER, ENGLAND, A BRITISH COMPANY.

ELECTRIC STEP-BY-STEP MOTOR.

Application filed June 13, 1924, Serial No. 719,700, and in Great Britain May 16, 1923.

This invention relates to electric step by step motors comprising a stator wound with magnetizing coils energized in sequence and a rotor adapted to take up a definite position according to the stator coils which are energized. Motors of this type are employed to obtain definite angular movements in steps synchronizing with the movements of a distributing switch or controlling apparatus through which the magnetizing coils are excited in order. In such motors as hitherto constructed the rotor may oscillate to such an extent as to throw it out of step, especially at certain speeds of rotation, and the chief object of the present invention is to provide a step by step motor which is capable of high speed and is not liable to oscillate or get out of step.

According to this invention the rotor is built up with laminations of magnetic material (separated by layers of non-magnetic material) arranged parallel with the axis of rotation of the rotor and disposed so as to follow substantially the natural flux paths from pole to pole of the stator. The magnetic reluctance of the motor is, therefore, at a minimum in positions in which the laminations follow the lines of magnetic force due to the excited stator coils and any displacement from this position is strongly resisted. The stator is wound preferably with three coils for each pair of poles, the coils being equally spaced, and on exciting the coils in succession through a distributing switch or controller a rotating field is produced passing through the rotor causing the rotor, owing to the arrangement of laminations, to turn with the rotating field and to stop whenever the rotation of the field stops. The coils are preferably wound in slots in the inner face of the stator.

To provide a further precaution against oscillation or displacement of the rotor relatively to the field, a shunt circuiting arrangement may be provided, preferably through suitable resistances or condensers or both, whereby any stator coil (or coils) having its axis normal to the direction of the flux produced by the energized coils is shunted and exercises a braking action on the rotor due to the currents induced by any mechanical oscillations of the rotor in the said coil. Coils having their axes parallel to that of the flux do not generate such currents and therefore take no part in the damping action.

In order that the said invention may be clearly understood and readily carried into effect, the same will now be described more fully with reference to the accompanying drawings, in which:—

Figures 1 to 6 are diagrams of a general arrangement embodying this invention, showing a current distributing switch or controller with three line wires connected to a three-phase stator winding, star connected, the direction of the current in the winding coils and the direction of rotation of the field in the motor being indicated by arrows.

Figures 7, 8 and 9 illustrate a convenient construction of a two-pole motor, Figure 7 showing it in sectional elevation, Figure 8 showing the stator winding and Figure 9 showing the rotor in end elevation; and Figures 10 and 11 illustrate in elevation a stator and a rotor of a four-pole motor.

The motor comprises a stator 1 built up of a number of stampings housed in a suitable frame 2 and a stator winding 3 consisting of three coils, one of which is shown in Figure 8 wound in slots 4 in the bore of the stator with the axes of the coils 120° apart. The connection of the windings may be star or delta or a combination of both, as in three-phase synchronous motors of known type. The stator in the two constructions illustrated is shown with twelve slots per pair of poles so as to give one tooth per step of the revolution.

In Figures 7, 8 and 9, the rotor 5 is laminated in the manner indicated in Figure 9, consisting preferably of laminations of soft charcoal iron interleaved either singly or in groups with laminations of non-magnetic material, such as aluminium, and as the motor is a two-pole one the laminations extend straight across the rotor in parallel formation, the cylinder of the rotor being completed by cap pieces 6 which are secured together by rivets, bolts or screws 7. The shaft 8 of the motor is arranged to run on ball races 9 in suitable housings in the end plates of the casing.

As shown in Figures 1 to 6 the three stator coils are supplied with current through a distributing switch 10 which is so arranged that each of the three line wires 11, 12 and 13 from the switch to the motor is positively energized for 150°, dead for 30°, then negatively energized for 150° and dead for 30° rotation of the transmitter switch. This is indicated in the diagrams, in which the angle OAB is 120° and the angle OCD is 30°. The angles need not, of course, be precisely of the values given. To assist in preventing oscillation of the rotor non-inductive resistances 14, 15 and 16 are connected in parallel to the respective stator coils, to form a shunt circuit to each stator coil when its axis is normal to the magnetic flux path on any step of the motor. The direction of the current in the stator coils is indicated in the usual manner for the various steps. Condensers 19, 20 and 21 may also be provided connected across the stator coils. For oscillations induced at the frequency due to vibratory movements of the rotor, the condensers have sufficient capacity to form a shunt or branch path. The connections shown in Figs. 1 to 6 form shunt paths for the parts of the stator winding having axes parallel to the flux axis as well as for those having their axes normal thereto, but this is only for constructional convenience and the shunt path is of no consequence for the first named parts of the stator winding as they do not generate the oscillatory currents in question.

It will be seen from Figures 1 to 6 that in alternate steps respectively two-thirds and the whole of the stator winding is in operation, so that the current fluctuations in the current supply lines and in the motor coils is not great, resulting in a substantially uniform magneto-motive force across the stator. The distributing switch energizes each line alternatively plus and minus and the six diagrams of Figures 1 to 6 represent one-half cycle, there being twelve steps per revolution of the motor corresponding to twelve positions of the magnetic field across the stator.

In the construction of the four-pole motor illustrated in Figures 10 and 11 the stator is provided with twenty-four slots, or twice the number of the stator of the two-pole motor illustrated in Figures 7, 8 and 9. The laminations in this case are, therefore, curved as shown so as to follow the path of the magnetic lines between the adjacent poles of the stator. The laminations are arranged about a star-shaped core 17 which provides a solid base for the construction of the rotor, the cylindrical surface of which is completed by the caps 18, oppositely disposed caps being connected by bolts or the like as shown. The radiating arms of the core retain the laminations securely in position. It is obvious that motors with more than four poles may be constructed on the present lines, with the requisite number of slots and coils for the stator and with the rotor arranged so that the laminated portion divides the periphery into the corresponding number of poles.

It will be seen that in the construction of the rotor there is provided a minimum magnetic reluctance in one direction only relatively to the magnetic field produced by the stator, the flux path following naturally the direction of the laminations from side to side. With the rotor laminations in line with the flux the only gap in the magnetic circuit is the clearance between the stator and rotor, but if the rotor laminations are displaced relatively to the flux the effective gap is greatly increased. By the arrangement of alternate laminations the flux is prevented from crowding to one side of the pole face and the fringing which occurs at the edge of each lamination increases the air gap area and enables a large flux to be obtained with a relatively small number of ampere turns in the stator winding.

What I claim and desire to secure by Letters Patent of the United States is:—

1. In an electric motor system of step by step type, a stator provided with at least three stator coils, a current distributor, leads from the current distributor to said stator coils, cross connections between said leads so that the parts of the stator winding having axes normal to the flux axis at any particular step form part of a closed circuit, and a rotor adapted to turn with the rotation of the magnetic field.

2. In an electric motor system of step by step type, a stator provided with at least three stator coils, a current distributor, leads from the current distributor to the said stator coils, cross connections between the said leads so that the parts of the stator winding having axes normal to the flux axis at any particular step form part of a closed circuit and a rotor adapted to set itself in accordance with the direction of the magnetic field of the stator.

3. In an electric motor system of step by step type, a stator provided with at least three stator coils, a current distributor, leads from the current distributor to the said stator coils, cross connections in the form of non-inductive resistances between the said leads so that the parts of the stator winding having axes normal to the flux axis at any particular step form part of a closed circuit and a rotor adapted to set itself in accordance with the direction of the magnetic field of the stator.

4. In an electric motor system of step by step type, a stator provided with at least three stator coils, a current distributor, leads from the current distributor to the said stator coils, cross connections in the form of non-inductive resistances and condensers between the said leads so that the parts of the stator winding having axes normal to the flux axis at any particular step form part of a closed circuit and a rotor adapted to set itself in accordance with the direction of the magnetic field of the stator.

HUGH CLAUSEN.